United States Patent
Cobianu et al.

(10) Patent No.: US 7,318,351 B2
(45) Date of Patent: Jan. 15, 2008

(54) PRESSURE SENSOR

(75) Inventors: Cornel P. Cobianu, Bucharest (RO); Stephen R. Shiffer, Xenia, OH (US); Bogdan Catalin Serban, Bucharest (RO); Alistair D. Bradley, Edinburgh (GB); Mihai N. Mihaila, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 37 days.

(21) Appl. No.: 11/244,499

(22) Filed: Oct. 5, 2005

(65) Prior Publication Data

US 2007/0074577 A1 Apr. 5, 2007

(51) Int. Cl.
*G01L 7/08* (2006.01)

(52) U.S. Cl. ............... 73/715; 73/719; 73/721; 73/753

(58) Field of Classification Search .......... 73/700–756; 361/283.1–283.4
See application file for complete search history.

(56) References Cited

U.S. PATENT DOCUMENTS

| | | | | |
|---|---|---|---|---|
| 5,088,329 A | * | 2/1992 | Sahagen | 73/727 |
| 5,262,195 A | | 11/1993 | Moss et al. | |
| 5,264,820 A | * | 11/1993 | Kovacich et al. | 338/42 |
| 5,333,505 A | * | 8/1994 | Takahashi et al. | 73/727 |
| 6,351,996 B1 | * | 3/2002 | Nasiri et al. | 73/706 |
| 2004/0183648 A1 | | 9/2004 | Weber et al. | |
| 2004/0255682 A1 | | 12/2004 | Petrova et al. | |

FOREIGN PATENT DOCUMENTS

| | | |
|---|---|---|
| EP | 0321225 B1 | 12/1992 |
| EP | 0814516 B1 | 9/2003 |
| GB | 2141548 | 12/1984 |

OTHER PUBLICATIONS

"Company Information", http://www.optomec.com/, (2003), 1-2.
Forlani, F. , "Thick-Film Sensors for Automatic Electronics", *Proceedings : European Hybrid Microelectronics Conference*, Copenhagan, Denmark, (1983), 165-177.
Harsanyi, G. , "Polymer thick-film technology: a possibility to obtain very low cost pressure sensors?", *Sensors and Actuators A (Physical)*, v A27, n 1-3, (May 1991),853-7.

* cited by examiner

*Primary Examiner*—Edward Lefkowitz
*Assistant Examiner*—Jermaine Jenkins
(74) *Attorney, Agent, or Firm*—Bradley A. Forrest

(57) ABSTRACT

A pressure sensor is constructed of a plastic package. The plastic package incorporates in the same material a sensing diaphragm including tensile and compression regions. Deposited on the diaphragm are metal electrodes and a polymer film having piezoresistive properties. The electrodes and/or the polymer film are directly printed onto the plastic package without the use of a mask.

10 Claims, 4 Drawing Sheets

PRESSURE SENSOR

TECHNICAL FIELD

Various embodiments of the invention relate to pressure sensors, and in particular, but not by way of limitation, piezoresistive pressure sensors.

BACKGROUND

Pressure sensors measure the compression and stretching (tension) of materials, and have many industrial, commercial and medical applications. Pressure sensors based on piezoresistive effects have been constructed using several different types of materials and films including metal films (with a gauge factor lower than 4) and silicon (with a gauge factor ranging from 60 to 200). Silicon based pressure sensors are normally manufactured using micro-electromechanical system (MEMS) technology, and have been extensively used in many fields including disposable sensors for medical applications, process control, and the automobile industry.

While silicon-based technology has been a driving factor in developing cost effective pressure sensors, recent advances in technologies other than silicon demonstrate that there are favorable alternatives to silicon in some applications. For example, MEMS technology in plastic materials has shown measurable promise as an alternative to silicon MEMS.

Additionally, homogeneous thin polymer films have recently been prepared by organic synthesis and have been proven to possess piezoresistive (PZR) effect. These films have a gauge factor in the range of 8 to 31 depending on the processing method. There are two classes of PZR thin polymer films commonly used. In a first class, the PZR effect is obtained in a thin film by nitrogen implantation in polymers like polyimides, polyacrylonitriles, polysulfones, and polyesters. In a second class, the PZR effect is obtained directly by spin coating a solution composed of poly anisidine p-toluene sulfonate dissolved in N,N-dimethylformamide. From these PZR thin polymers, a PZR film based on polyaniline is obtained, whose gauge factor is around 8, and whose electrical resistivity may be as low as 10.6 ohm*cm for a layer thickness of 3.8 micrometers.

In addition to spin coating, a thin film can be obtained from a liquid phase by means of dip coating and spray coating, in which a sol-gel transition occurs at the end of each casting process. However, spin coating, dip coating, and spray coating all suffer from the fact that the resulting film is deposited on the whole surface of a substrate, and subsequent photolithographic and etching processes are needed to obtain a patterned film. Consequently, a large quantity of film is wasted during both the coating and removal processes.

DETAILED DESCRIPTION

Figure 1:
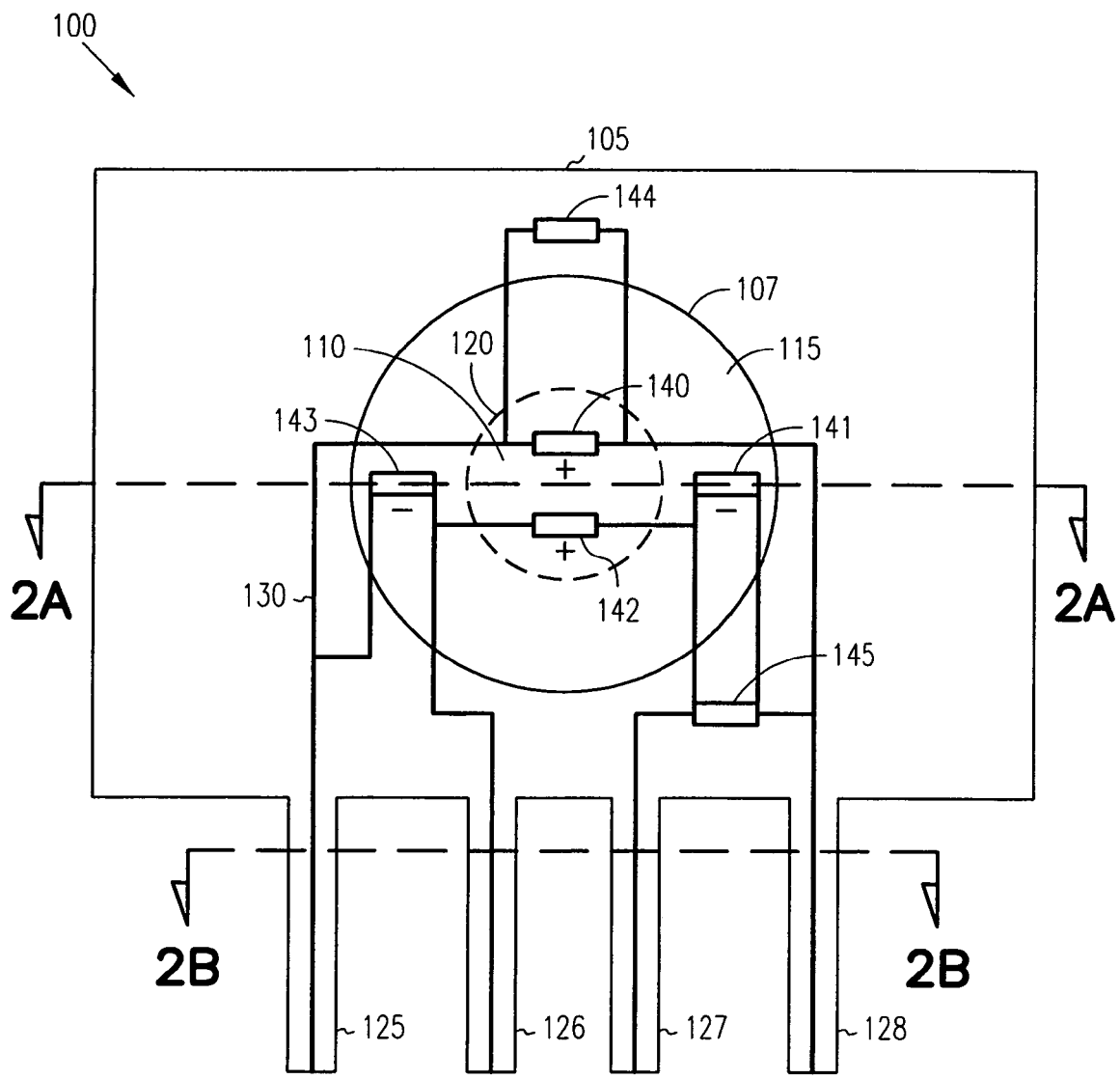
FIG. 1 is a top planar view of an example embodiment of a pressure sensor on a molded diaphragm.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In several embodiments, a novel piezoresistive (PZR) pressure sensor includes a plastic package provided with an integral diaphragm, overpressure stop, and piezoresistors. The piezoresistors may be made of homogeneous or non-homogeneous polymeric films as further disclosed herein. In an embodiment, the plastic package that incorporates a pressure sensing diaphragm region may be formed as a single part (integrally) by molding or stereo-lithographic processes. In another embodiment, strain induced in the integral diaphragm over the working range of the pressure sensor should remain in the elastic domain of the polymer material. This retaining of the strain may be accomplished by one or more overpressure stops. In another embodiment, metal lines that form the sensor circuit traces and interconnects may be directly deposited onto the package before PZR layer deposition. These metal lines may be fabricated by classical physical deposition followed by selective etching, or by a selective deposition process. In yet another embodiment, passivation layers of Teflon and/or Parylene may be deposited over the diaphragm and/or metallization and PZR layers to address media and environmental issues. In connection with this embodiment, two deposition methods having temperatures compatible with the plastic substrate are disclosed, including a selective deposition method that may be used before and/or after deposition of the metallization and PZR layers.

Specifically, in particular embodiments, pressure sensitive elements are formed from either homogenous or non-homogenous conductive thin film polymers that are applied onto plastic packaging provided with pressure-sensing diaphragm. In an embodiment, the organic PZR layer is applied on the substrate using Maskless Mesoscale Material Deposition technology (M3D) developed by Optomec, Inc., Albuquerque, N. Mex. (www.optomec.com). In one or more embodiments, M3D technology allows for the maskless selective application of both the liquid phase of the organic PZR sensing layer and the metallization layer without a mask. Low temperature annealing is used for the solid thin films consolidation after their selective deposition in the liquid phase. In another embodiment, the composition of a liquid precursor of a PZR film is modified in order to enhance both the electrical conductivity and the piezoresistive effect of the precursor and the resulting PZR film. This M3D technology produces a film with piezoresistive effect from a solution by directly printing an atomized liquid or colloidal suspension on a substrate at a precise location on the substrate. This direct printing is an additive and maskless process, and there is no material waste at the end of the deposition process. Alignment of the position of the layer to the geometry of the substrate may be carried out with an auto vision camera using location positional reference points around the substrate. An alignment tolerance of about 1 micron can be achieved this way. M3D technology bridges the gap between thin film technology such as chemical vapor deposition (CVD) and physical vapor deposition (PVD), and thick film technology such as screen printing, by creating features on a substrate between 10 micrometers and 100 microns wide on a substrate. In another embodiment, a technology involving gas phase deposition of Teflon produces passivation thin films of approximately 6 microinches thickness, protecting the plastic package from humidity penetration. This alternative technology is offered by GVD Corporation, Massachusetts.

Figure 3:
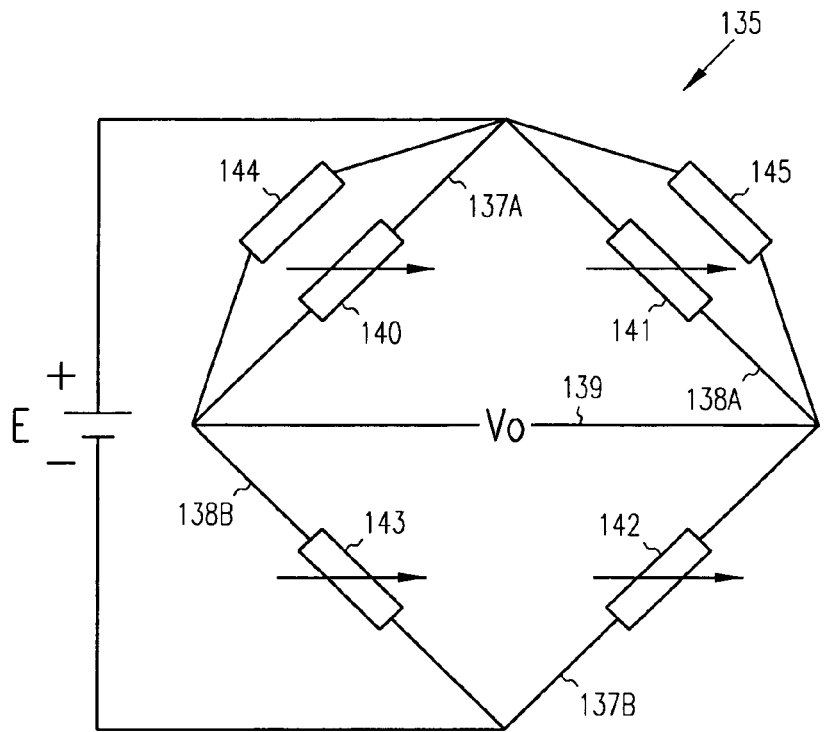
FIG. 3 is a schematic diagram of a Wheatstone bridge that may be used in connection with an example embodiment of the invention.

FIG. 1 illustrates a top planar view of an embodiment of a thin polymer film-based piezoresistive pressure sensor selectively ink-jetted onto a molded plastic package having a thinned pressure sensing diaphragm. Specifically, pressure sensor 100 has a plastic package 105. The sensor 100 has a diaphragm 107 having a central tensile region 110, a compression region 115 surrounding the tensile region, and a transition contour 120 between the tensile and compression regions. Formed into the plastic package 105 are plastic pins 125, 126, 127, and 128 for external electrical connection. Deposited on the package 105 are electrodes 130, and piezoresistors 140, 141, 142, 143, 144, and 145. As shown in FIG. 3, the electrodes and resistors of the embodiment of FIG. 1 form a Wheatstone bridge 135, with trimming resistor 144 in parallel with resistor 140, and trimming resistor 145 in parallel with resistor 141. Wheatstone bridge 135 has a first set of opposite arms 137a and 137b, and a second set of opposite arms 138a and 138b. Trimming resistors 144 and 145 are primarily for adjusting the zero value of the output (139) of the Wheatstone bridge. In addition these may be used to adjust the pressure sensitivity and thermal characteristics of the Wheatstone bridge. Alternative trim circuits could equally be realized. In the embodiment of FIG. 1, the trimming resistors are located in a stress free region, i.e. out of the confines of the pressure sensing diaphragm 107. A power supply is connected to pins 126 and 128, and the output of the bridge is shunted to pins 125 and 127.

The positioning of resistors 140, 141, 142, and 143 on the pressure sensing diaphragm may be determined via a simulation of the strain regime of the diaphragm in the presence of an external pressure. An external pressure causes a tensile stress in the central region of the diaphragm (tensile region 110) and a compression stress in the outer annular region (compression region 115) of the diaphragm. In the circuit configuration of FIG. 3, there is maximum pressure sensitivity when the piezoresistors 140, 141, 142, and 143 have similar resistances, each varying with the magnitude of the strain to which they are exposed. Those of skill in the art will further realize that such maximum sensitivity is obtained when the piezoresistors are precisely located in the well controlled stressed regions of the pressure sensing diaphragm 107. In the embodiment of FIG. 1, the resistors 140 and 142 are symmetrically located in the central stretched (tensile) region of the diaphragm, while the resistors 141 and 143 are symmetrically located on the edge or compressed region of the diaphragm. It should be noted that the Wheatstone bridge configuration of FIG. 1 is only an example of one circuit that can be used in connection with the invention, and in cases having specific requirements such as particular input and output impedances, sensitivity trim, and temperature compensation, a variety of much more complex circuits can be applied by those of skill in the art.

For maximum sensitivity of the Wheatstone bridge, the four piezoresistors 140, 141, 142, and 143 should have the same resistances at atmospheric pressure (or some other reference pressure). This resistance at the reference pressure may be denoted as $R_0$. Then, at pressures other than the reference pressure, the resistances of the four piezoresistors will change as follows:

$$R140 = R_0(1+x)$$

$$R141 = R_0(1-x)$$

$$R142 = R_0(1+x)$$

$$R143 = R_0(1-x)$$

wherein $x = G*S$, and further wherein G is the gauge factor and S is the strain induced in the piezoresistor due to a change in external pressure applied on the pressure sensing diaphragm.

Figure 2A:
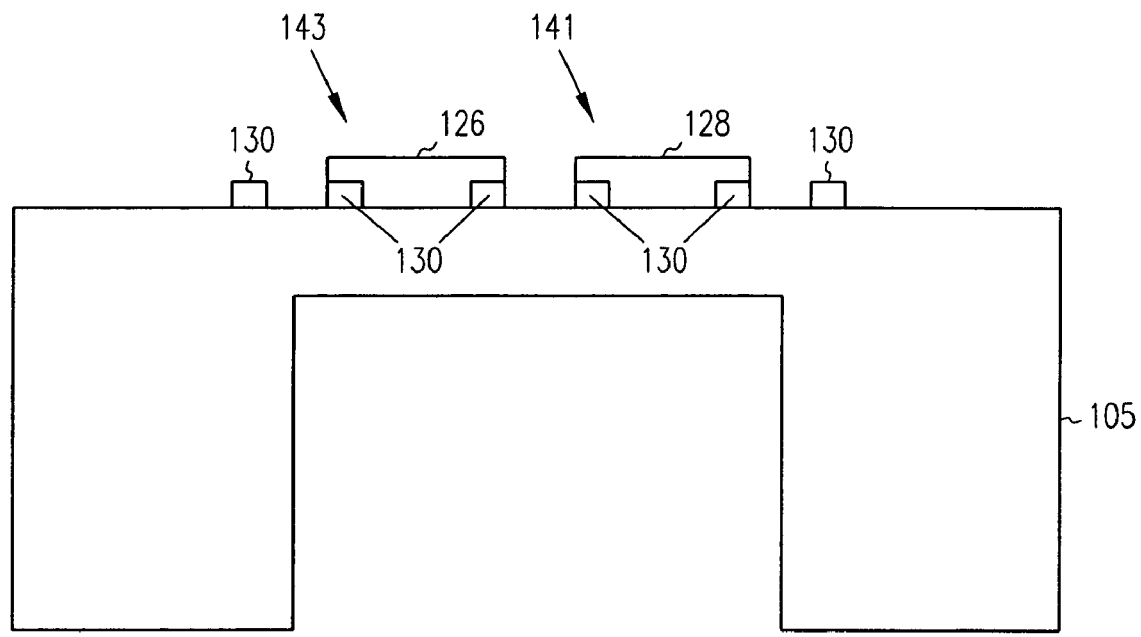
FIG. 2A is a cross section along line 2A in FIG. 1.
Figure 2B:
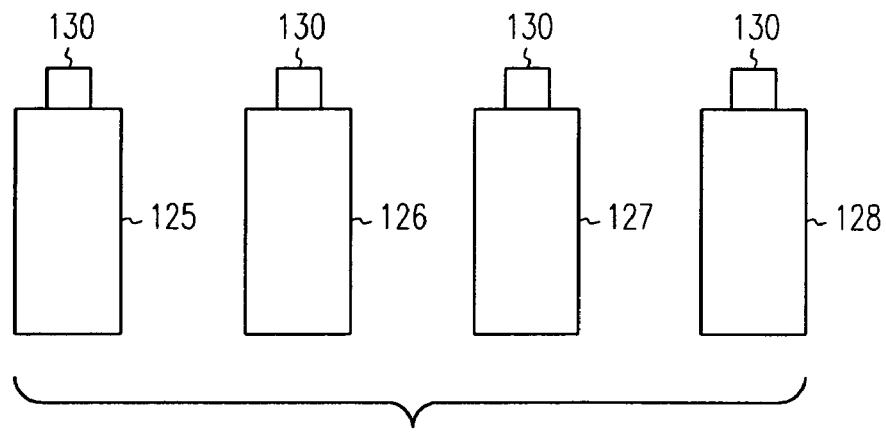
FIG. 2B is a cross section along line 2B in FIG. 1.

FIGS. 2A and 2B illustrate cross sections of FIG. 1 along lines 2A and 2B respectively. FIG. 2A shows the electrodes 130 connecting the resistors 141 and 143 in the Wheatstone bridge configuration. FIG. 2B shows the metal electrodes 130 deposited on the plastic pins 125, 126, 127, and 128.

Figure 5:
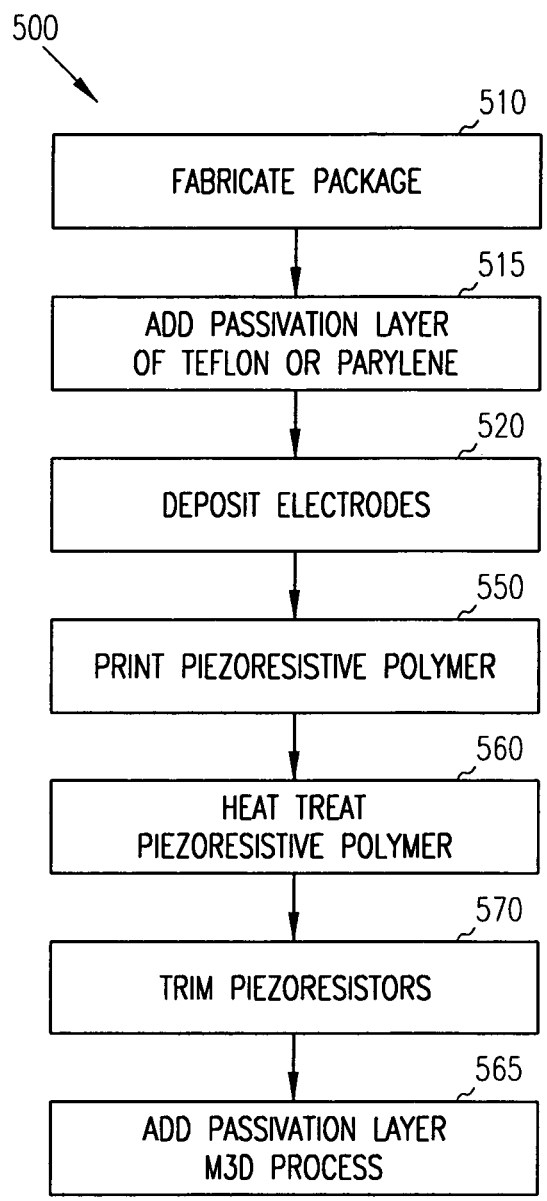
FIG. 5 illustrates an example embodiment of a process to fabricate a pressure sensor.

In an embodiment, the pressure sensor molded diaphragm illustrated in FIG. 1 may be manufactured using a process such as that illustrated in FIG. 5. The process 500 of FIG. 5 at its highest level involves two steps—fabrication of the plastic package containing a pressure sensing diaphragm and metallized plastic pins (510, 520), followed by a selective printing of the piezoresistors and trimming resistors on the plastic package (550, 560, 570). In other embodiments, a passivation layer of Teflon or Parylene may be added after the package is fabricated (515), and a passivation layer may be added using an M3D process at the end of the package process (565).

In an embodiment, the technology to fabricate (510) the plastic package 105 is standard plastic molding technology, except that the pressure sensing diaphragm 107 is created locally. That is, a thinner plastic region 110 is fabricated in the middle of the thicker plastic package 105. In an embodiment, this thinner plastic region has a thickness of approximately 75-125 micrometers. In another embodiment, the thickness and diameter of the pressure sensing diaphragm 107 is sized so that when a maximum pressure is applied to the diaphragm, a corresponding maximum strain remains in the elastic domain.

In another embodiment, molding of one or more diaphragms in a polymer material enables formation of the pressure diaphragm and housing at the same time, thereby greatly simplifying the assembly and therefore reducing the cost. Polymers used for this could be any polymers that are suited to injection molding (e.g. polycarbonates, polyesters such as PET or nylon, or PVC) and that remain mechanically and chemically stable when exposed to various media and cleaning/sterilization processes, with the glass temperature, $T_g$, significantly higher than any subsequent operating and/ or processing temperatures (e.g. high performance polymers such as liquid crystal polymers, PEEK™, polyetherimide, polysulphone, and polyimide). A process embodiment may be Thermotech's proprietary Micro-Mold® process for precision molding, which is capable of achieving tolerances on the order of 1 micron. Precision molding allows the diaphragm deflection and position in the housing to be well defined and reduce, or even remove, the need for individual device calibration/trim.

Figure 6:
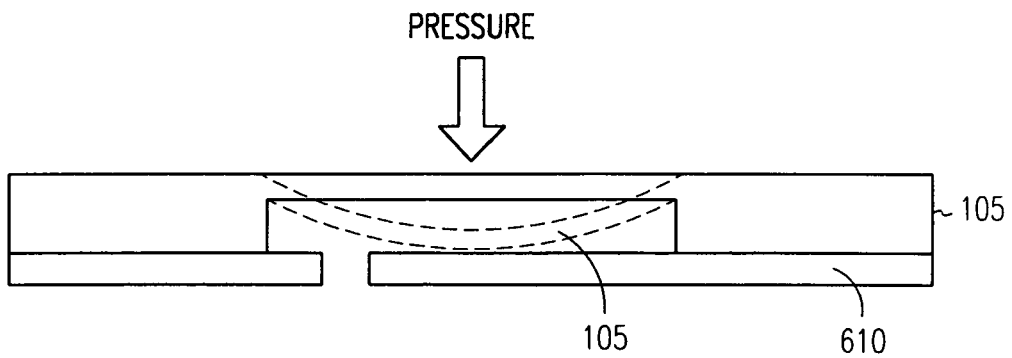
FIG. 6 illustrates an example embodiment of an overpressure stop that may be used in connection with embodiments of the invention.

In one or more embodiments, the maximum deflection, and consequently the maximum strain, in the diaphragm is alternatively limited by an overpressure stop included as part of the plastic package. In an embodiment illustrated in FIG. 6, an overpressure stop for pressure applied from a first direction is more simply provided by making the thickness of the plastic package 105 equal to the maximum deflection and locating the plastic package on a solid surface 610. In alternative embodiments, overpressure stops for pressure in either direction are included as a part of the plastic package structure.

In an alternative embodiment, the technology to fabricate the plastic package with integral diaphragm and an optional overpressure stop structures is by stereolithographic processing of photopolymers, a technique commonly used in rapid prototyping processes. In particular, a suitable high resolution manufacturing process with better than 5 micron control of feature size can be employed using Rapid Micro Product Development (RMPD®) technologies provided by microTEC Gesellschaft für Mikrotechnologie mbH, Duisberg, Germany (www.microtec-d.com).

In one embodiment, the connection between the sensing elements and the electronic circuit (i.e., the piezoresistors and the outside world) is made by depositing a metal layer (520) on the plastic package and then using photolithographic processes and metal etching to obtain patterned metal connections to electrically connect the Wheatstone bridge and the metallized interconnects (pins 125-128 in the embodiment of FIG. 1).

In an alternative embodiment, the connection between the sensing elements and electronic circuit is accomplished in a novel manner via M3D technology. Using M3D technology, the metal line is formed by means of maskless, direct printing of the metal path starting with a liquid precursor of the metal deposition technology. The details of the M3D direct printing will be discussed in connection with FIG. 4, and embodiments of the liquid precursor will also be explained in detail infra. In an embodiment, the metal paths are as large in cross-sectional area as possible so that they add negligible series resistance to the piezoresistive Wheatstone bridge. Thus, the sensor sensitivity and gauge factor of the piezoresistive polymer film is preserved. This maskless metallization approach is compatible with a continuous line manufacture such as in a reel-to-reel processing environment.

Selective printing of the piezoresistors and trimming resistors (550) on the plastic package involves polymer piezoresistive thin film deposition (using M3D technology). In an embodiment, these film deposition steps include an organic synthesis of the liquid phase (sol) of the polymer piezoresistive thin film. An optional step improves the electrical conductivity and/or the piezoresistivity of the sol of the thin polymer film, and in an embodiment, involves the addition of impurities such as metal nanoparticles or carbon nanotubes. The liquid phase is then selectively printed (i.e., maskless) on the plastic package thereby forming the piezoresistors and trimming resistors. After printing, the gel layers are heat treated (560) in order to dry and consolidate the thin polymer film. A laser is then used to trim the resistance values of the trimming resistors. In another optional step, a Teflon-like film is deposited selectively and masklessly by M3D technology for passivation purposes over the organic PZR films, while preserving the area where the ohmic contact between the metal line and the organic piezoresistor will be made.

In another embodiment, doping of polyanilines with molecules that are larger than toluene sulfonic acid may be used for the synthesis of the thin polymeric film. P-sulfonato-calix[n]arenes (n=4,6,8), p-sulfonato-calix[n]arenes (n=4,6, 8) tosylates, carboxylic acids of calix[n]arenes (n=4,6,8), sulfonated crown ethers, sulfonated cyclodextrines, carboxylic acid of nanotubes, or carboxylic acid of fullerenes may be used for such doping. All these compounds are soluble in water and other solvents, and are able to generate π-stacking interactions with polyanilines, thus increasing the conductivity of polymeric film. The soluble conducting polymers may be prepared in at least two ways. In a first synthesis, a preferred substituted aniline (aniline substituted with an o-methoxy group and an o-ethoxy group, with the o-methoxy and o-ethoxy groups mixed in equimolar amounts) can be polymerized by combining with an oxidant such as hydrogen peroxide, in the presence of water solution of the acid dopant. In this embodiment the dopant agents may be p-sulfonato-calix[n]arenes (n=4,6,8) tosylates or sulfonated crown ethers. If sulfonated crown ethers are resistant in the presence of peroxide water, calix[n]arenes and their derivatives are susceptible to oxidation. Thus, phenolic groups should be converted into sulfonic esters with the assistance of tosyl chloride (in order to protect the —OH phenolic from further oxidation). The monomer to oxidant ratio is about 1.5. An alternative synthesis is to polymerize the substituted aniline in hydrochloric acid using an oxidant (e.g., peroxide water), then convert the polyaniline hydrochloride to its free base with triethylamine. Consequently, the free base reacts with the doping agent. In this embodiment, p-sulfonato-calix[n]arenes (n=4,6,8), p-sulfonato-calix[n]arenes (n=4,6,8) tosylates, carboxylic acids of calix[n]arenes (n=4,6,8), sulfonated crown ethers, sulfonated cyclodextrines, carboxylic acid of nanotubes, or carboxylic acid of fullerenes may be the doping agents. It is noted that in this alternative synthesis, all classes of doping agents are suitable since the oxidation stage occurred previously.

In an embodiment in which the electrical conductivity and/or piezoresistivity of the thin polymer film is enhanced, metal nanoparticles may be added to the conductive composite sol. These metal nanoparticles dope the initial polyanilines layer and increase the electrical conductivity of the layer. The metal nanoparticles also increase the gauge factor without affecting the quality of the edges of the metal line, this is in contrast to the larger, micrometer-sized, embedded particles in a layer. In another embodiment, electrical conductivity and the gauge factor of the thin polymer layer is increased by the addition of carbon nanotubes with metallic conducting behavior (i.e., their electrical resistance increases as a function of temperature increase) to the liquid phase of the polyanilines sol.

Figure 4:
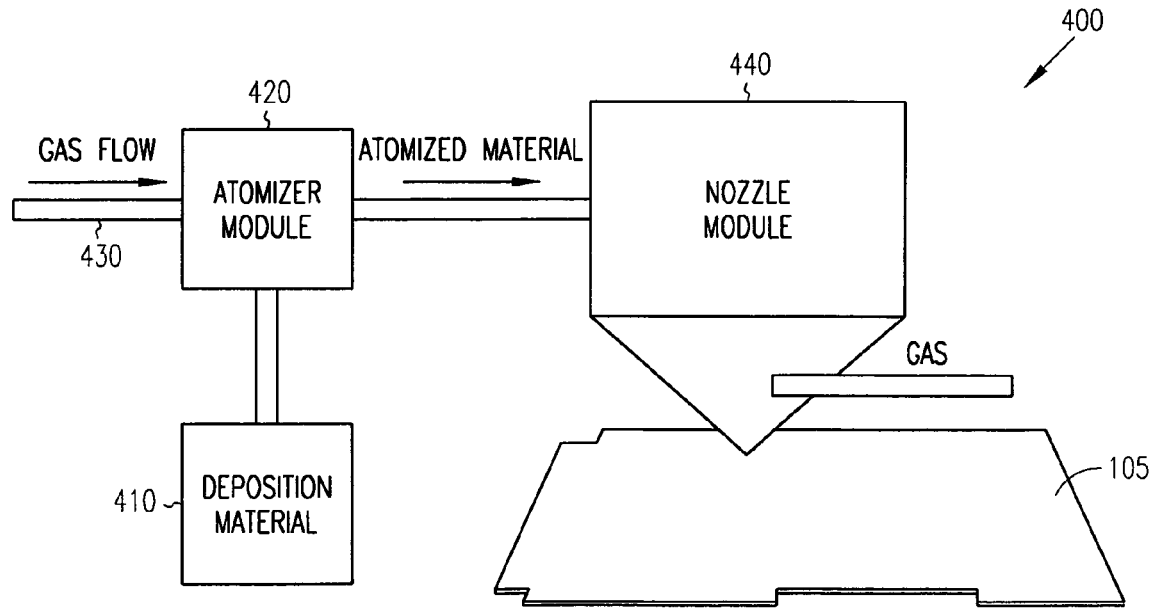
FIG. 4 is a diagram of a device that may be used in connection with maskless ink-jet deposition of films from a liquid phase on a substrate in connection with an example embodiment of the invention.

FIG. 4 illustrates an embodiment of a system 400 for the M3D technology's selective (maskless) printing of the liquid phase on the package thereby forming the piezoresistors and trimming resistors. The system in FIG. 4 includes a module 410 containing the source of the liquid phase (sol), which supplies the deposition material to the atomizer module 420. The atomizer module transforms the liquid phase of the desired piezoresistive thin polymer film into colloidal suspensions. These suspensions are transported by a carrier gas flow 430 to a nozzle module 440 that focuses the aerosol and deposits well-controlled droplets onto the package 105.

The gel layers are then exposed to a heat treatment in order to dry and consolidate the piezoresistive thin polymer film. After the colloidal particles have reached the substrate the deposited polymer reaches the gel state. For the consolidation of the solid phase of the thin polymer film, the gel state should be thermally treated at about 130 degrees C. In an embodiment, this thermal process may be performed within the M3D process by means of a laser treatment. The laser should be chosen in such a way that the bulk of the energy is absorbed only in the piezoresistive layer. The heat treatment for the above polyanilines layer is about 130 degrees C.

In an embodiment, adjustment of the resistance value of the trimming resistors may be performed with laser technology, and can also be part of the M3D process. In addition, passivation of the piezoresistive polymer film with a Teflon-like film deposited by M3D technology can be performed by preparing the liquid phase of the Teflon-like layer and then depositing it with the additive maskless process as previously described.

In another embodiment, before deposition of the piezoresistors and metal interconnects, a blank passivation of the plastic package with a layer of polytetrafluoroethylene (PTFE, Teflon™) can be performed by a hot filament chemical vapor deposition (HFCVD) process ("Overhang Test Structure Deposition Profiles of Flurocarbon Films", C. B. Labelle and K. K. Gleason, *Advanced Materials: Chemical Vapor Deposition*, Vol. 6, p. 27 (2000)). With this process, a hydrophobic layer of PTFE is deposited on cold plastic substrates by the decomposition of hexafluoropropylene oxide (HFPO) on the hot filament in a vacuum chamber. The polymerization of the singlets of difluorocarbene ($CF_2$) on the plastic substrate held at room temperature will give a hydrophobic conformal layer of $-(CF_2CF_2)_n-$ (Teflon™) which will not allow humidity to penetrate the plastic package.

In another embodiment, a passivation layer of Parylene can be deposited on the plastic package before the PZR organic layer deposition. This Parylene layer is deposited by a method similar to the just-described method, with the only difference being that a vaporization step is added at the beginning of the thin film deposition, since the starting precursor is a powder that should be vaporized in the pyroliser.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. An article comprising:
   a plastic package comprising a pressure sensing diaphragm including a tensile region and a compression region;
   a metal electrode forming a circuit on said package; and
   one or more piezoresistors positioned in said circuit;
   wherein said tensile region and said compression region are formed in a polymer diaphragm, wherein said polymer diaphragm is contained within a elastic domain, wherein said elastic domain is defined by the thickness and diameter of said polymer diaphragm, and wherein said elastic domain is further defined by one or more overpressure stops.

2. The article of claim 1, wherein said plastic package further comprises a plurality of metalized plastic interconnects, wherein two of said interconnects serve as an input into said circuit, and two of said interconnects serve as an output of said circuit.

3. The article of claim 2, further comprising:
   a first deformation in said compression region;
   a second deformation in said tensile region;
   a change in resistance of said one or more piezoresistors caused by said deformations; and
   a change in a voltage between said output interconnects caused by said change in resistance.

4. The article of claim 1 wherein said piezoresistors comprise a polymer film, and further wherein said polymer film comprises:
   a polyanisidine; and
   a doping agent.

5. The article of claim 4,
   wherein said doping agent is selected from the group consisting of p-sulfonato-calix[n]arenes (n=4,6,8), p-sulfonato-calix[n]arenes (n=4,6,8) tosylates, carboxylic acids of calix[n]arenes (n=4,6,8), sulfonated crown ethers, sulfonated cyclodextrines, carboxylic acid of nanotubes, and carboxylic acid of fullerenes.

6. The article of claim 4, further comprising:
   metal nanoparticles in said polymer film; and
   a passivation layer, said passivation layer selected from a group consisting of polytetrafluoroethylene and Parylene;
   wherein said Parylene is deposited by a modified hot filament chemical vapor deposition process comprising an addition of a sublimation step of a powder precursor.

7. An article comprising:
   a plastic package comprising a pressure sensing diaphragm including a tensile region and a compression region;
   a metal electrode forming a circuit on said package; and
   a Wheatstone bridge positioned in said circuit;
   wherein said Wheatstone bridge comprises a first piezoresistor, a second piezoresistor, a third piezoresistor, and a fourth piezoresistor, said first piezoresistor and said third piezoresistor positioned in a first set of opposite arms of said bridge, and said second piezoresistor and said fourth piezoresistor positioned in a second set of opposite arms of said bridge; and wherein said first piezoresistor and said third piezoresistor are positioned on said diaphragm on a region with a first type of strain in said first set of opposite arms of said bridge, and said second piezoresistor and said fourth piezoresistor are positioned on said diaphragm on a region with a second type of strain in said second set of opposite arms of said bridge.

8. The article of claim 7, further comprising a first trimming resistor and a second trimming resistor, said first trimming resistor in parallel with said first piezoresistor, and said second trimming resistor in parallel with said second piezoresistor.

9. An article comprising:
a plastic package provided with a pressure sensing diaphragm comprising a tensile region and a compression region;
a metal electrode forming a circuit on said package; and
one or more piezoresistors positioned in said circuit;
wherein said metal electrode and said one or more piezoresistors form a Wheatstone bridge comprising a first piezoresistor, a second piezoresistor, a third piezoresistor, a fourth piezoresistor, a first trimming resistor, and a second trimming resistor;
wherein said first piezoresistor and said third piezoresistor are positioned on said diaphragm on a region with a first type of strain in a first set of opposite arms of said bridge, said second piezoresistor and said fourth piezoresistor are positioned on said diaphragm on a region with a second type of strain in a second set of opposite arms of said bridge, said first trimming resistor is in parallel with said first piezoresistor, and said second trimming resistor is in parallel with said second piezoresistor;

wherein said piezoresistors comprise a polymer film; and further wherein said polymer film comprises a doping agent selected from the group consisting of p-sulfonato-calix[n]arenes (n=4,6,8), p-sulfonato-calix[n]arenes (n=4,6,8) tosylates, carboxylic acids of calix[n]arenes (n=4,6,8), sulfonated crown ethers, sulfonated cyclodextrines, carboxylic acid of nanotubes, and carboxylic acid of fullerenes.

10. The article of claim 9, further comprising:
a force producing a strain on said article;
a first deformation in said compression region;
a second deformation in said tensile region;
a change in resistance of said one or more piezoresistors caused by said force; and
a change in output voltage of said Wheatstone bridge caused by said change in resistance.

* * * * *